US 9,265,116 B2

(12) United States Patent
Chen et al.

(10) Patent No.: US 9,265,116 B2
(45) Date of Patent: Feb. 16, 2016

(54) CONSTANT VOLTAGE AND CONSTANT CURRENT DRIVER CIRCUIT

(71) Applicants: Timothy Chen, Aurora, OH (US); Andrew Charles Hussey, Stow, OH (US)

(72) Inventors: Timothy Chen, Aurora, OH (US); Andrew Charles Hussey, Stow, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 14/326,566

(22) Filed: Jul. 9, 2014

(65) Prior Publication Data

US 2015/0351188 A1      Dec. 3, 2015

Related U.S. Application Data

(60) Provisional application No. 62/005,321, filed on May 30, 2014.

(51) Int. Cl.
| | |
|---|---|
| *H05B 37/02* | (2006.01) |
| *H05B 33/08* | (2006.01) |
| *H02M 7/06* | (2006.01) |
| *H02M 1/44* | (2007.01) |

(52) U.S. Cl.
CPC ............ *H05B 33/0857* (2013.01); *H02M 1/44* (2013.01); *H02M 7/06* (2013.01); *H05B 33/0809* (2013.01)

(58) Field of Classification Search
USPC ............................. 315/209 R, 291, 307, 308
See application file for complete search history.

(56) References Cited

U.S. PATENT DOCUMENTS

| | | | |
|---|---|---|---|
| 4,323,839 A | 4/1982 | Imazeki et al. | |
| 4,947,159 A | 8/1990 | DiSanto et al. | |
| 5,959,413 A | 9/1999 | Komarek et al. | |
| 6,570,372 B2 | 5/2003 | Barcelo et al. | |
| 7,042,199 B1 | 5/2006 | Birchenough | |
| 7,804,256 B2 | 9/2010 | Melanson | |
| 7,830,676 B2 | 11/2010 | Telefus et al. | |
| 8,331,114 B2 | 12/2012 | Yang et al. | |
| 8,508,143 B2 * | 8/2013 | Okubo | 315/224 |
| 8,664,877 B2 * | 3/2014 | Jin et al. | 315/247 |
| 8,710,754 B2 | 4/2014 | Baddela et al. | |
| 8,716,955 B2 | 5/2014 | Chuang et al. | |
| 2008/0180414 A1 | 7/2008 | Fung et al. | |

(Continued)

FOREIGN PATENT DOCUMENTS

| | | |
|---|---|---|
| CN | 102137534 | 7/2011 |
| EP | 2579688 | 4/2013 |
| WO | 2014/028722 | 2/2014 |

OTHER PUBLICATIONS

PCT, International Search Report and Written Opinion; Patent Application No. PCT/US2015/031323 (Aug. 18, 2015).

*Primary Examiner* — Thuy Vinh Tran
(74) *Attorney, Agent, or Firm* — Thompson Hine LLP

(57) ABSTRACT

A driver circuit for delivering a generally constant voltage to a load is disclosed. The driver circuit includes a source of incoming AC power, a rectifier, and a constant voltage driver. The rectifier is connected to the source of incoming AC power and produces a DC voltage. The constant voltage driver receives the DC voltage from the rectifier. The constant voltage driver includes a selectively activated switching element for receiving the DC voltage, a controller, and an output line. The controller receives the DC voltage and is configured to send a drive signal to the switching element in order to activate the switching element. The output line provides the generally constant voltage to the load.

43 Claims, 6 Drawing Sheets

(56) References Cited

U.S. PATENT DOCUMENTS

| | | |
|---|---|---|
| 2010/0295472 A1 | 11/2010 | Wibben et al. |
| 2012/0161666 A1 | 6/2012 | Antony et al. |
| 2013/0049621 A1* | 2/2013 | Yan et al. ............... 315/205 |
| 2014/0070783 A1 | 3/2014 | Stueve |
| 2014/0104901 A1 | 4/2014 | Nguyen |
| 2014/0239930 A1 | 8/2014 | Wang et al. |
| 2014/0300274 A1* | 10/2014 | Acatrinei ............... 315/85 |

* cited by examiner

CONSTANT VOLTAGE AND CONSTANT CURRENT DRIVER CIRCUIT

RELATED APPLICATIONS

This application claims the benefit of U.S. Provisional Application No. 62/005,321, filed on May 30, 2014.

TECHNICAL FIELD

The present disclosure relates generally to a driver circuit, and more particularly to a driver circuit for delivering generally constant voltage and a generally constant current to a load.

BACKGROUND

Light emitting diode (LED) based lighting systems may offer several energy and reliability advantages over other types of lighting systems such as, for example, incandescent or fluorescent lighting. Thus, LED based lighting systems may be widely used to replace other existing lighting technologies.

In one approach for providing an LED based light, multiple LEDs may be connected in series with one another in a string within a lighting fixture, where the LEDs may be driven at a regulated current. Specifically, a bypass switch such as, for example, a metal-oxide-semiconductor field-effect transistor (MOSFET) or a bipolar junction transistor (BJT) may be used to selectively control current to a specific group of LEDs located within the string. However, this type of arrangement may be relatively difficult or very complex to control. Therefore, there exists a continuing need in the art for a more efficient, simpler, and cost-effective approach for controlling one or more LEDs.

SUMMARY

In one embodiment, a driver circuit for delivering a generally constant voltage to a load is disclosed. The driver circuit includes a source of incoming AC power, a rectifier, a constant voltage driver, and at least one constant current driver in communication with the output line of the constant voltage driver. The rectifier is connected to the source of incoming AC power and produces a DC voltage. The constant voltage driver receives the DC voltage from the rectifier. The constant voltage driver includes a selectively activated switching element for receiving the DC voltage, a controller, and an output line. The controller receives the DC voltage and is configured to send a drive signal to the switching element in order to activate the switching element. The output line provides the generally constant voltage to the load.

In another embodiment, a driver circuit for delivering a generally constant voltage and generally constant current to at least one LED is disclosed. The driver circuit includes a source of incoming AC power, a rectifier, a constant voltage driver, and at least one constant current driver. The rectifier is connected to the incoming source of AC power and produces a DC voltage. The constant voltage driver receives the DC voltage from the rectifier. The constant voltage driver includes a floating ground. The constant voltage driver includes a selectively activated high-side switching element for receiving the DC voltage, a controller, and an output line. The controller receives the DC voltage and is configured to send a drive signal to the high-side switching element to activate the high-side switching element. The output line provides the generally constant voltage to the at least one LED. The constant current driver is in communication with the output line of the constant voltage driver.

In yet another embodiment, a driver circuit for delivering a generally constant voltage and generally constant current to at least one LED is disclosed. The driver circuit includes a source of incoming AC power, a rectifier, a constant voltage driver, and at least one constant current driver. The rectifier is connected to the incoming source of AC power, and produces a DC voltage. The constant voltage driver receives the DC voltage from the rectifier. The constant voltage driver is grounded to earth. The constant voltage driver includes a selectively activated switching element for receiving the DC voltage, a controller, and an output line. The controller receives the DC voltage, and is configured to send a drive signal to the switching element to activate the switching element. The output line provides the generally constant voltage to the at least one LED. The constant current driver is in communication with the output line of the constant voltage driver.

DETAILED DESCRIPTION

Figure 1:
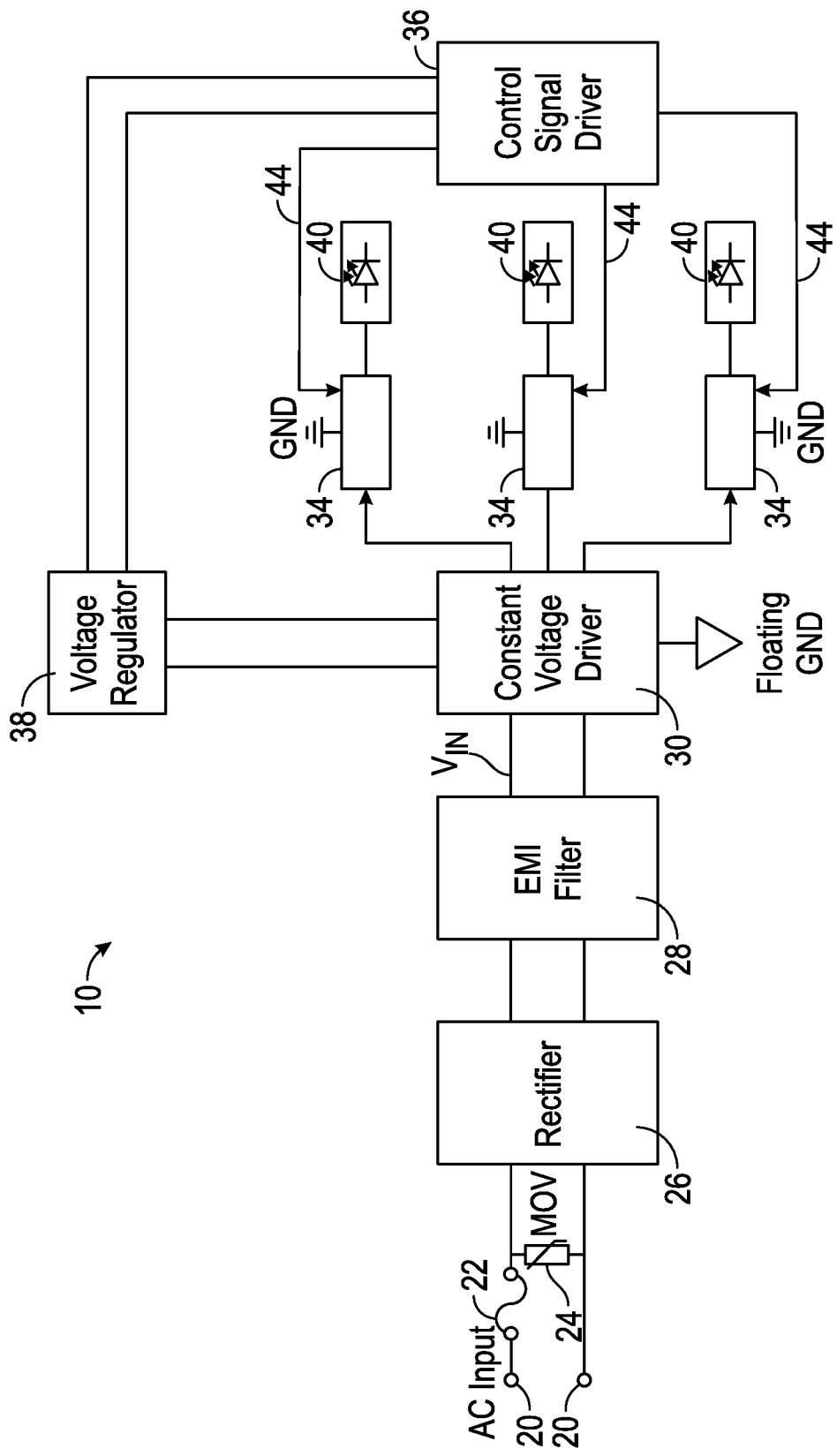
FIG. 1 is an exemplary block diagram of a driver circuit.

The following detailed description will illustrate the general principles of the invention, examples of which are additionally illustrated in the accompanying drawings. In the drawings, like reference numbers indicate identical or functionally similar elements.

FIG. 1 is an exemplary block diagram of a driver circuit 10 used to provide substantially constant current and substantially constant voltage to a load. In one non-limiting embodiment, the load may be one or more light emitting diodes (LEDs) that are connected to one another in series. The driver circuit 10 may include a pair of power input lines 20 for connection to a source (not shown) of AC power such as, for example, main power lines at a nominal 120 volts AC. The driver circuit 10 may also include a fuse 22, a varistor such as a metal-oxide varistor (MOV) 24, a rectifier 26, an electromagnetic interference (EMI) filter 28, a constant voltage driver 30, one or more constant current drivers 34, a control signal driver 36, a voltage regulator 38, and one or more LED arrays 40. Each LED array 40 may include one or more LEDs that are connected to one another in series in a string. A single constant current driver 32 may be provided for each LED array 40.

Figure 2:
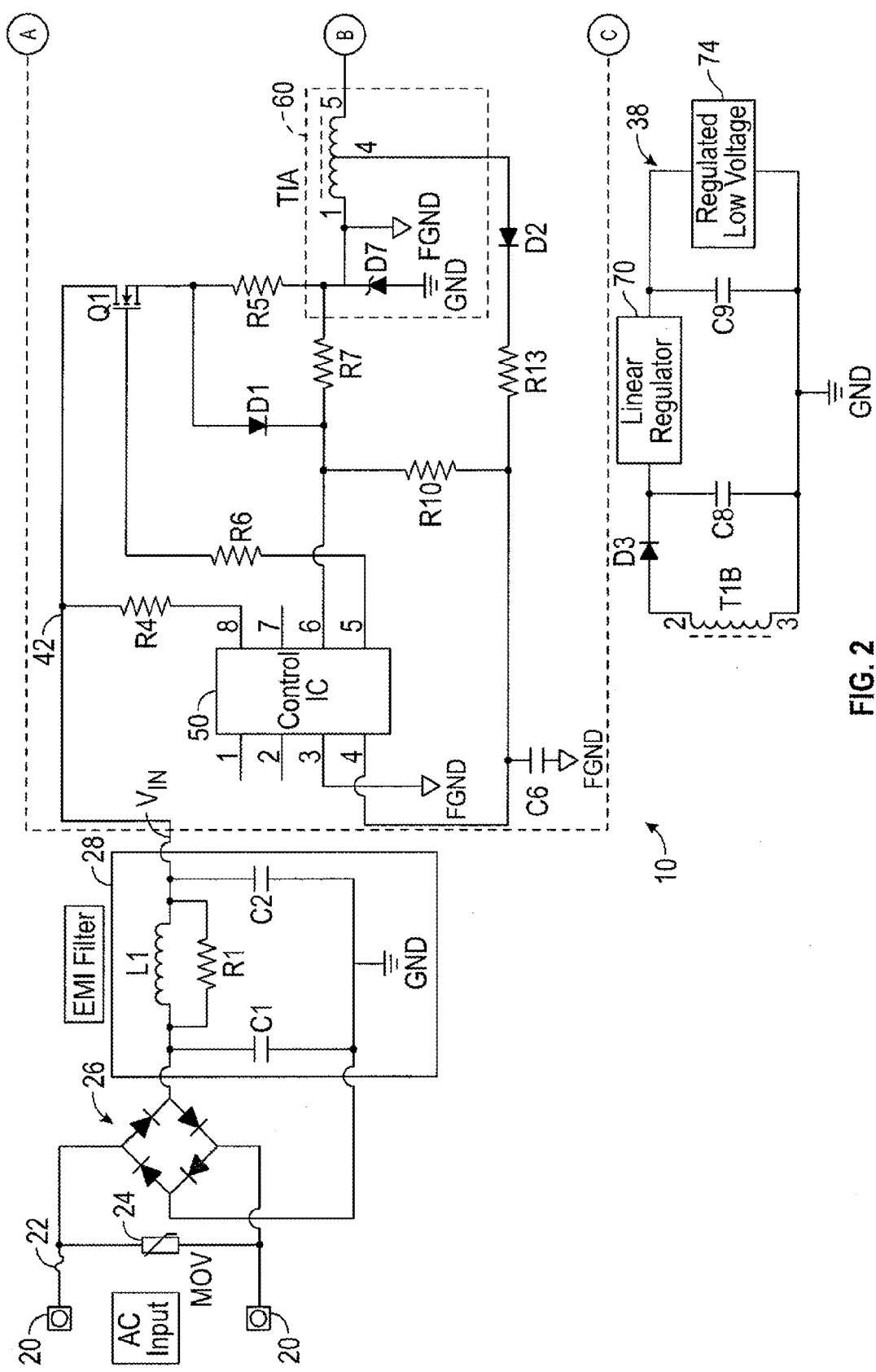
FIG. 2 is an exemplary circuit diagram illustrating the driver circuit shown in FIG. 1.
Figure 2:
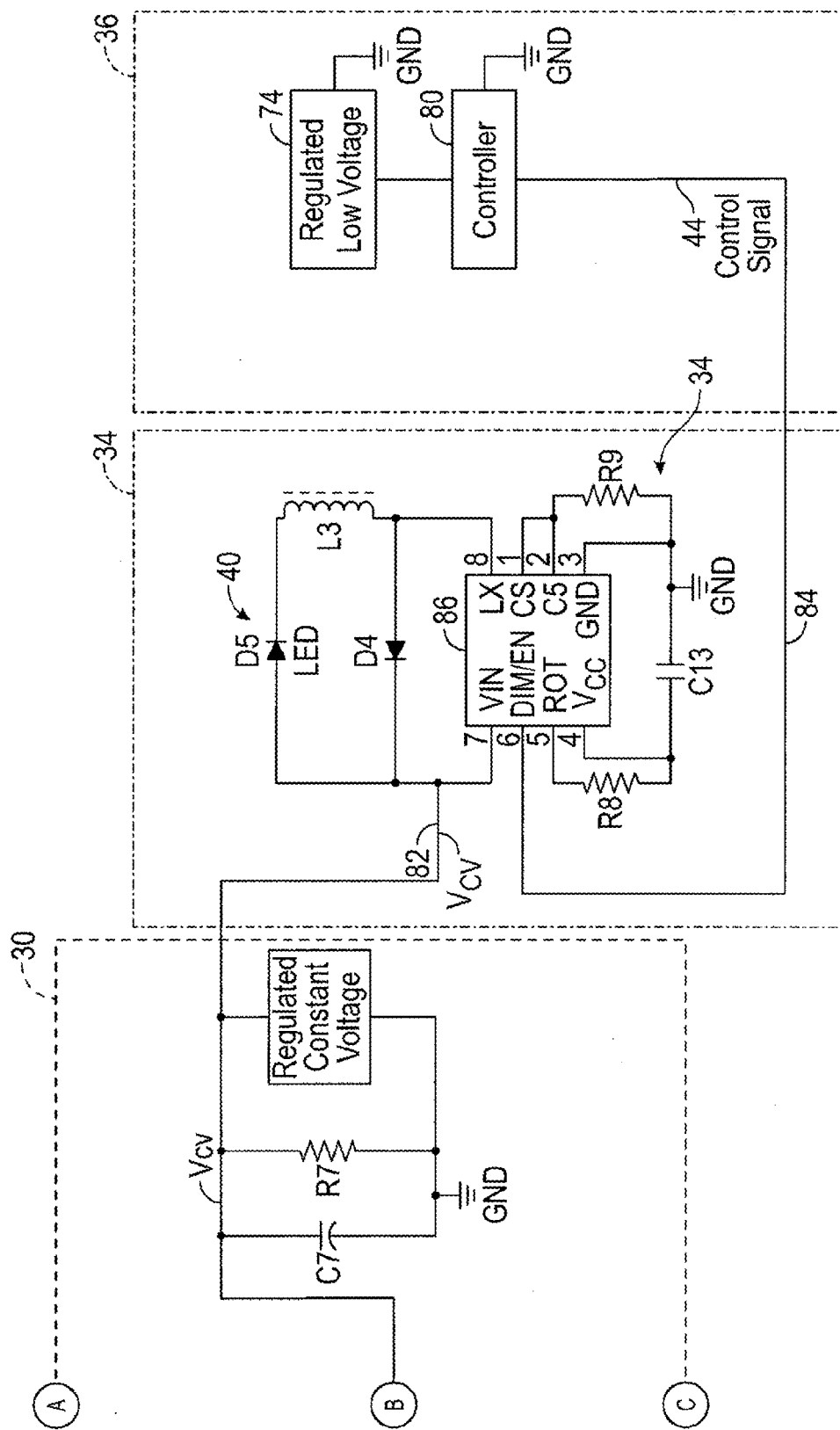

The input lines 20 may be connected to the rectifier 26, which converts incoming AC power to a pulsing DC power. Although the rectifier 26 is shown as a full wave diode bridge rectifier, any other type of full wave rectifier may be used as well. The output of the rectifier 26 is connected to the EMI filter 28. Referring to both FIGS. 1 and 2, in one non-limiting embodiment the EMI filter 28 may include an inductor L1 connected in parallel with a resistor R2, as well as two capacitors C1 and C2. The output of the EMI filter 28 may be referred to as an input voltage $V_{IN}$. As seen in FIG. 1, the input voltage $V_{IN}$ may be provided to the constant voltage driver 30. As discussed in greater detail below, the constant voltage driver 30 includes circuitry and control logic for providing a substantially constant voltage to the constant current drivers 34. Each constant current driver 34 may be used to provide substantially constant current to a corresponding one of the LED arrays 40.

The control signal driver 36 may be used to provide a drive or control signal 44 to the constant current drivers 34 in order to control light output. In one exemplary embodiment, the LED arrays 40 may be driven using pulse width modulated (PWM) control. Those skilled in the art will readily appreciate that by controlling a shape, duration, and frequency of PWM pulses, the light output of the LED arrays 40 may be controlled. Although PWM control is described, it is to be understood that this configuration is merely an illustrative example of how the LED arrays 40 may be driven. For example, in another embodiment an analog control signal also known as linear control may be used instead to control the light output of the LED arrays 40.

The constant current drivers 34 may be driven by the control signal driver 36 in order to control the LED arrays 40 separately from one another. Therefore, in one embodiment, the LED arrays 40 may each have different color temperatures from one another, thereby resulting in different variations of white light (e.g., a cool bright white versus a warm yellow light). In another approach, the LED arrays 40 may be of various colors (e.g., one of the LED arrays 40 may be green, another LED array 40 may be blue, and a third LED array 40 may be yellow). Therefore, the constant current drivers 34 may each be driven separately in order to provide the required current to each LED array 40 in order to maintain the desired color (e.g., green, blue, or yellow). In yet another embodiment, the LED arrays 40 may be based on red, green, blue (RGB) color mixing, where one of the LED arrays 40 may be red, another LED array 40 may be green, and a third LED array 40 may be blue. The constant current drivers 34 may each be driven separately in order to mix the light output of the LED arrays 40 together with one another to produce light of a specified color. For example, in one embodiment, the LED arrays 40 may be mixed together to produce white light.

In one embodiment, the LED arrays 40 may be comprised of white LEDs to generate white light. In this approach, the constant current drivers 34 may each be driven separately from one another in order to modify the white light based on the color temperature of the white LEDs. For example, in one embodiment, the white LEDs may have a color temperature ranging from about two degrees Kelvin to about sixty-five hundred degrees Kelvin. Each constant current driver 34 may control a corresponding LED array 40 in order to make the white LEDs relatively cooler (which results in a bluish-white light) or relatively hotter (which in turn results in a relatively amber-white light). In this specific approach, the white LEDs are not dimmed.

In an alternative approach where dimming is utilized, the constant current drivers 34 may each be driven separately from one another in order to dim as well as modify the color temperature of the white LEDs. This is because LEDs do not typically change color as they dim, unlike incandescent lights. For example, dimming a 100 Watt incandescent light bulb by 75% of full intensity results in a color change from bluish-white to amber-white. In contrast, reducing the current of a LED reduces intensity, but the spectral power distribution remains about the same. Thus, the constant current drivers 34 may control the LED arrays 40 such that as the LED arrays 40 are dimmed, the color temperature of the LED arrays 40 are increased as well (i.e., to result in a relatively amber-white light as the light output of the LED array 40 is decreased).

In the exemplary embodiment as shown in FIG. 1, the constant voltage driver 30 includes a floating ground, and the constant current drivers 32 are each grounded to earth. A floating ground for the constant voltage driver 30 may provide an improved or enhanced power factor for the driver circuit 10. However, it is to be understood that in an alternative embodiment, the constant voltage driver 30 may be grounded to earth, and the constant current drivers 32 may each be provided with a floating ground as well.

Figure 3:
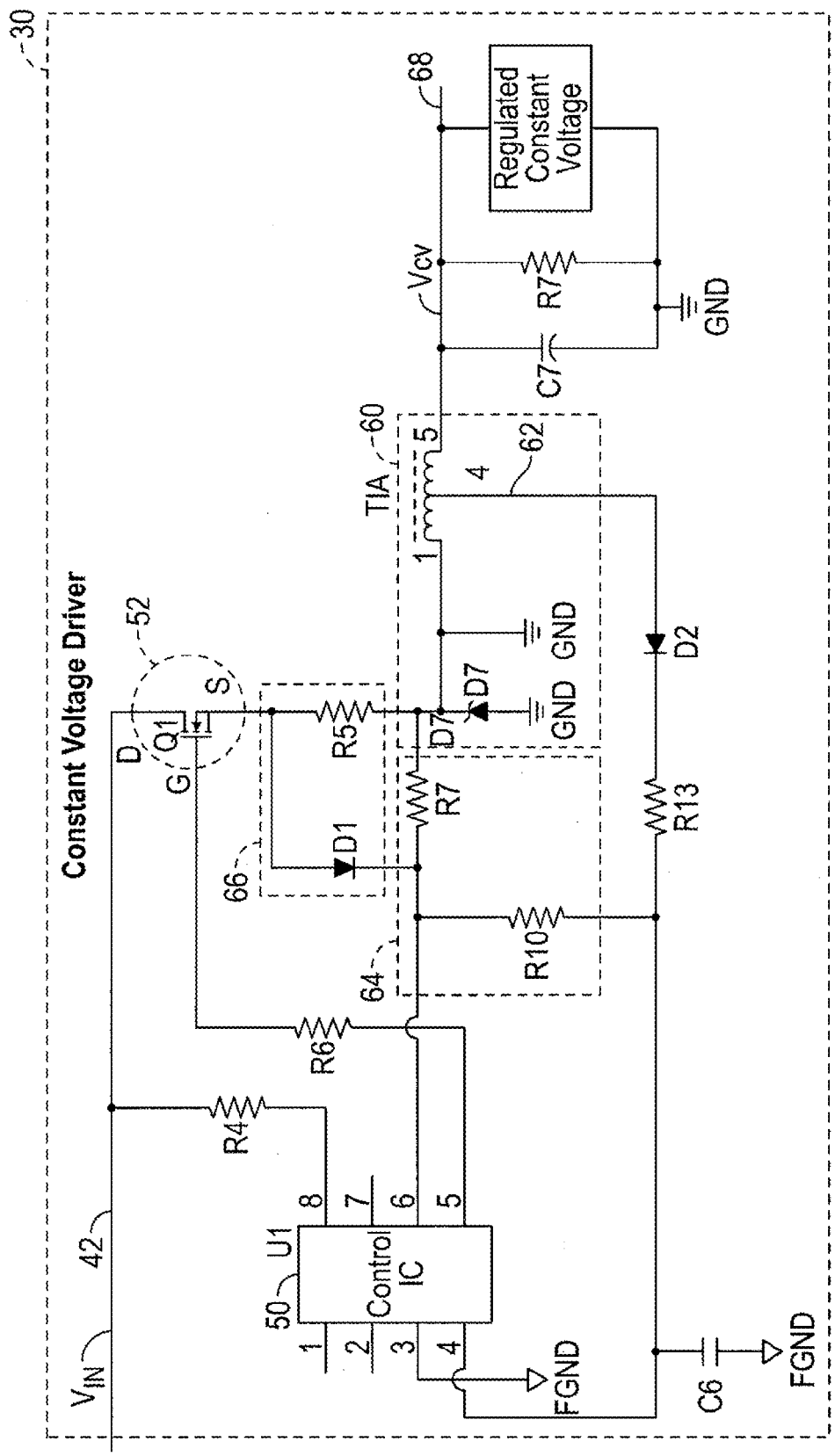
FIG. 3 is a circuit diagram illustrating a constant voltage driver shown in FIGS. 1 and 2.

FIG. 3 is an exemplary circuit diagram of the constant voltage driver 30. Referring to both FIGS. 2-3, the input voltage $V_{IN}$ may be provided to an input line 42 of the constant voltage driver 30. The input line 42 may be connected to a controller 50 as well as a switching element 52. The controller 50 may refer to, be part of, or include an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor. The term code, as used above, may include software, firmware, or microcode, and may refer to programs, routines, functions, classes, or objects.

The switching element 52 may be any type of transistor such as, for example, a metal-oxide-semiconductor field-effect transistor (MOSFET) or a bipolar junction transistor (BJT). In the embodiment as illustrated, the switching element 52 is an N-Channel MOSFET. The input line 42 is connected to a drain D of the switching element 52. Using an N-Channel MOSFET may result in a relatively low resistance from drain to source ($R_{DS}$). Having a relatively low $R_{DS}$ may result in less power being lost across the MOSFET, and in turn will produce less heat. In the exemplary embodiment as shown, the switching element 52 is arranged in the constant voltage driver 30 as a selectively activated high-side switch, and the constant voltage driver 30 includes a floating ground. The switching element 52 is used to source current to the constant voltage driver 30, and is controlled by a drive signal from the controller 50, which is described in greater detail below.

Figure 4:
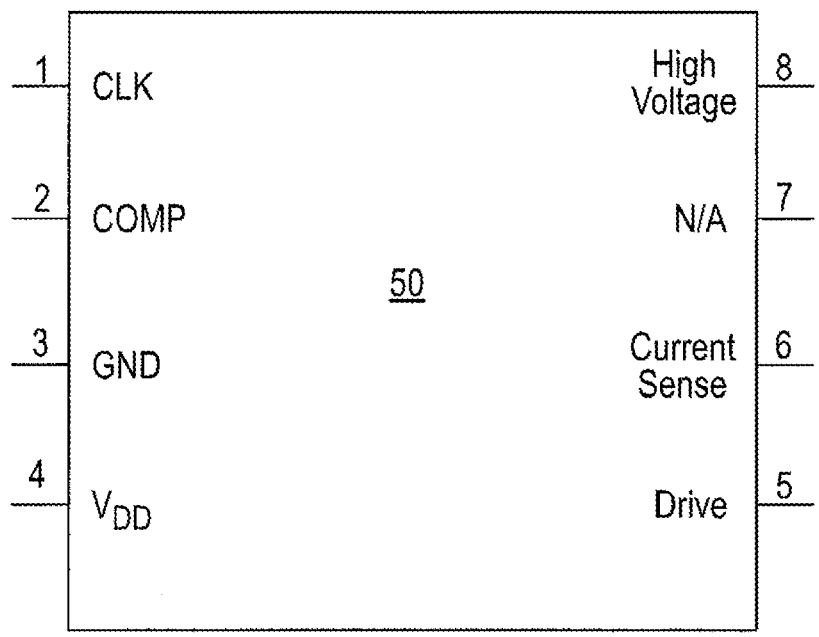
FIG. 4 is a schematic illustration of a controller shown in FIG. 3.

FIG. 4 is a detailed view of the controller 50. In one embodiment, the controller 50 may operate at fixed frequency discontinuous mode. As seen in FIG. 4, the controller 50 may include eight pins or input/outputs. Specifically, pin 1 is clock, pin 2 is compensation, pin 3 is ground, pin 4 is power supply ($V_{DD}$), pin 5 is drive, pin 6 is current sense, pin 7 is unused, and pin 8 is high voltage. Referring to both FIGS. 3 and 4, the input line 42 is connected to and delivers power to high voltage pin 8 through resistor R4. Delivering power to high voltage pin 8 activates or turns on the controller 50. Once the controller 50 is activated, current is sent though power supply pin 4 and charges a storage capacitor C6. The storage capacitor C6 may be, for example, an electrolytic capacitor or a ceramic capacitor.

The controller 50 continues to send current through power supply pin 4 until the storage capacitor C6 is charged to a predetermined or threshold charge level. Specifically, the controller 50 includes circuitry or control logic for determining when the storage capacitor C6 has been charged to the threshold level. Once the storage capacitor C6 is charged to the threshold charge level, then the controller 50 may send a drive voltage through drive pin 5, and to a gate G of the switching element 52. The drive voltage may be sufficient to activate or turn on the switching element 52. In one embodiment, in order to turn on the switching element 52 the drive voltage should be greater than the voltage at a source S of the switching element ($V_s$) plus the threshold voltage of the switching element ($V_{th}$), or $V_S+V_{th}$.

Once the switching element 52 is activated, current may flow from the switching element 52 and to a buck converter 60. In the non-limiting embodiment as shown in FIG. 3, the buck converter 60 may include a transformer including a primary side winding T1A, a secondary side winding T1B (shown in FIG. 5), as well as a flyback or freewheeling diode D7, however those skilled in the art will appreciate that other types of voltage step down converters may be used as well. In one exemplary embodiment, the freewheeling diode D7 is a Schottky diode. A central tap 62 may be placed centrally at the primary winding T1A. The central tap 62 sends current from the primary winding T1A through a diode D2 and a resistor R13. The current from the central tap 62 may be used to charge capacitor C6, and is also fed to power supply pin 4 of the controller 50. Thus, the constant voltage driver 30 is a self-feeding circuit since a portion of the current from the buck converter 60 is re-routed back to the controller 50.

The current sense pin 6 may be used to determine both the voltage as well as peak current flowing from the switching element 52 to the buck converter 60. Specifically, with reference to FIG. 3, resistors R3 and R10 may form a voltage divider circuit 64 that is used to step down voltage from the switching element 52. In addition to voltage sensing, a resistor R5 and a diode D1 may make up a peak current sense circuit 66, which sends the peak current from the switching element 52 to the current sense pin 6.

The controller 50 may be used to regulate voltage provided to the buck converter 60 based on the voltage created by the voltage divider circuit 64 and the peak current created by the peak current sense circuit 66, which are both sent to the current sense pin 6. Specifically, the controller 50 may operate between a minimum and maximum threshold voltage. For example, in one embodiment, the minimum operating threshold voltage may be about eleven volts. The controller 50 is only activated if the threshold voltage exceeds eleven volts. The maximum operating threshold may be about sixteen volts. This means that if the voltage exceeds this value, then the controller 50 is turned off or deactivated.

In the event the controller 50 is deactivated or turned off, the constant voltage driver 30 may still output substantially constant voltage. This is because the freewheeling diode D7 that is part of the buck converter 60 allows an inductor (e.g., the primary winding T1A) to draw current from itself in the event the controller 50 is deactivated. Therefore, a substantially constant voltage may be provided by the constant voltage driver 30, even in the event the controller 50 is deactivated. A storage capacitor C7 may be provided to reduce or substantially eliminate any ripple from the output voltage of the buck converter 60. Thus, as seen in FIG. 3, the constant voltage driver 30 may produce a regulated generally constant voltage $V_{CV}$ at output line 68.

Figure 5:
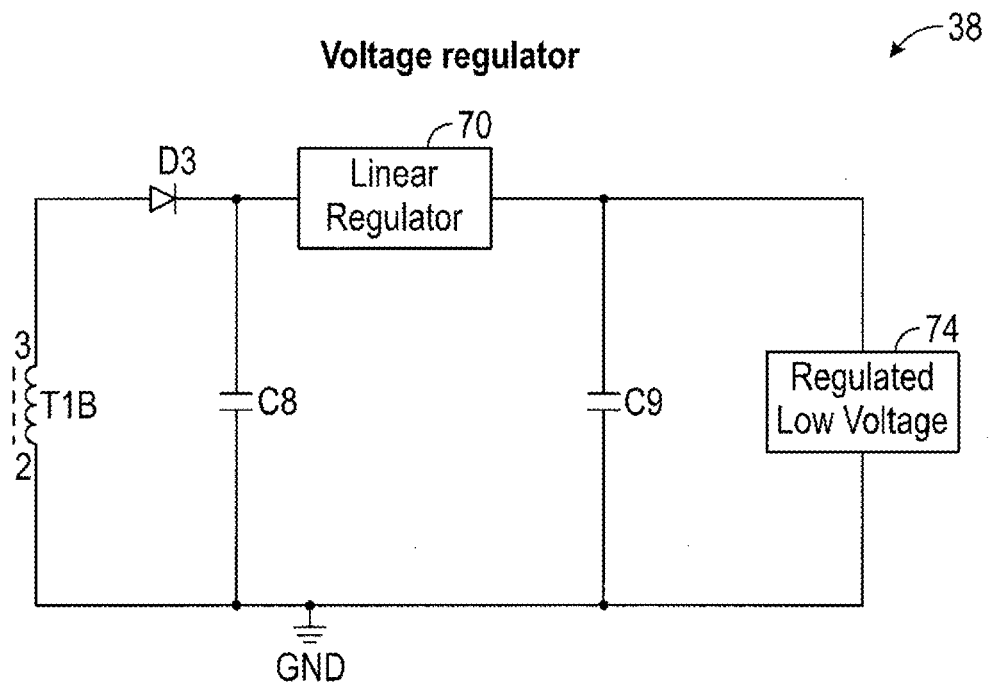
FIG. 5 is a circuit diagram illustrating a voltage regulator shown in FIGS. 1 and 2.

FIG. 5 is an exemplary illustration of the voltage regulator 38. Referring to both FIGS. 3 and 5, the voltage regulator 38 may include the secondary side winding T1B of the buck converter 60, a diode D3 arranged in series with the secondary side winding T1B, a linear voltage regulator 70, and two capacitors C8 and C9 that are in parallel with one another. The voltage regulator 38 may be used to produce a regulated low voltage 74 that is supplied to the control signal driver 36 (shown in FIG. 7). In one exemplary embodiment, the regulated low voltage 74 may be about 3.3 volts, however it is to be understood that other voltage values may be used as well.

The number of turns on the secondary side winding T1B may be adjusted in order to step down the voltage from the primary side winding T1B of the buck converter 60 (FIG. 3) before the voltage from the primary side winding T1B is sent to the linear voltage regulator. For example, in one embodiment the secondary side winding T1B may step down the voltage from the primary side winding T1A from about 30 volts to about 5 volts. This in turn may reduce the amount of heat that is dissipated from the linear voltage regulator 70. Specifically, the secondary side winding T1B may be used to step down the voltage from the buck converter 60 first, before the linear regular 70 further steps down the voltage from the buck converter 60. Those skilled in the art will readily appreciate that the voltage from the buck converter 60 may be directly provided to the linear regular 70, however this approach may generate more heat and is not as efficient as the illustrated approach.

Figure 6:
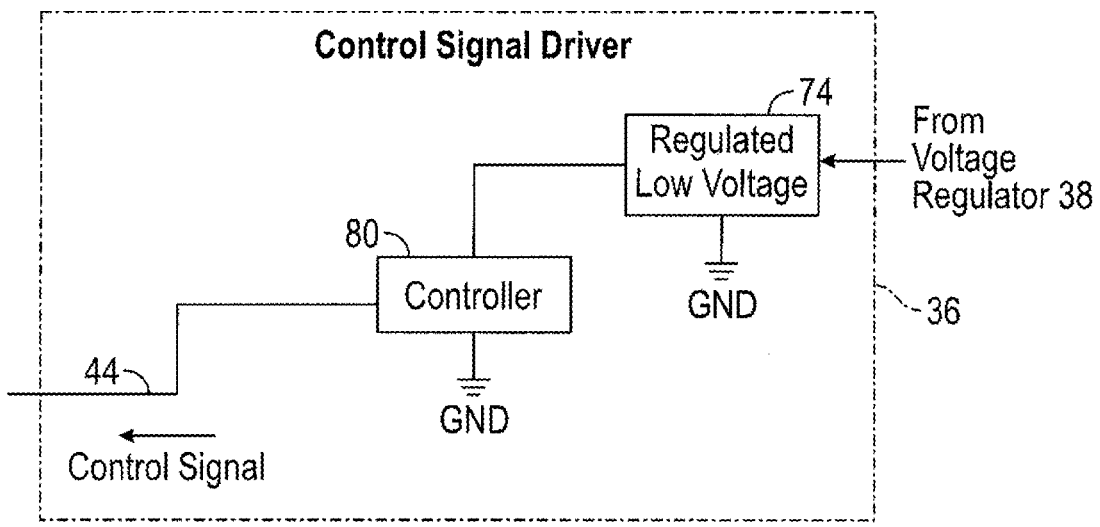
FIG. 6 is an illustration of a control signal driver shown in FIGS. 1 and 2.

FIG. 6 is an illustration of the control signal driver 36. Referring to FIGS. 1-2 and 5-6, the control signal driver 36 receives the regulated low voltage 74 from the voltage regulator 38. The regulated low voltage 74 may be sent to a controller 80. The controller 80 sends the drive signal 44 to one or more constant current drivers 34, and is described in greater detail below and illustrated in FIG. 7.

Figure 7:
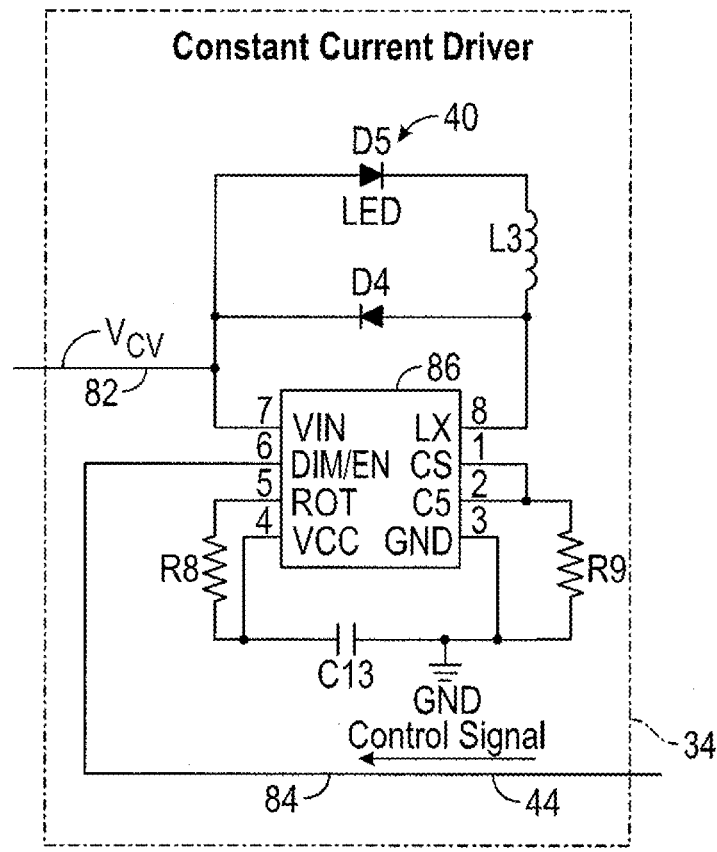
FIG. 7 is an illustration of a constant current driver shown in FIGS. 1 and 2.

FIG. 7 is a circuit diagram of an exemplary constant current driver 34. In the embodiment as shown in FIG. 7, the LED array 40 includes only a single LED D5. However, it is to be understood that the constant current driver 44 may be used to drive an array of LEDs connected to one another in series as well. The constant current driver 44 may include a constant voltage input line 82 as well as a drive signal input line 84, a controller 86, an inductor L2, a diode D4, resistors R8 and R9, and a capacitor C13. In the exemplary embodiment as shown in FIG. 7, the controller 86 may include eight pins or input/outputs. Specifically, pin 1 is a current sense, pin 2 is a current sense, pin 3 is ground, pin 4 is a power supply ($V_{CC}$), pin 5 is an off timer, pin 6 is driver control, pin 7 is input voltage ($V_{IN}$), and pin 8 is drain. One commercially available example of the controller 86 is integrated circuit (IC) model number NCL30160 which is commonly used for LED control, and is available from ON Semiconductor Trading Ltd., of Hamilton, Bermuda.

Pins 1 and 2 are both current sense pins, and may be used to set the current through the LED D5. Specifically, the resistor R9 connects both current sense pins 1 and 2 to ground. A voltage is developed across both current sense pins 1 and 2, and the controller 86 determines the current based on the voltage across pins 1 and 2.

The drive signal 44 from the control signal driver 36 (FIG. 6) is sent to driver control pin 6, and the regulated constant voltage $V_{CV}$ from the constant voltage driver 30 (FIG. 3) is delivered to the input voltage pin 7 of the controller 86. The regulated constant voltage $V_{CV}$ from the constant voltage driver 30 is also supplied to the LED array 40. The controller 86 may also include control logic for regulating the current to the LED array 40. Specifically, the drain pin 8 may regulate the current to the LED array 40 such that the LED array 40 is provided with generally constant current (e.g., by switching frequency). The inductor L2 may be provided between the drive pin 8 and the LED array 40, and is used to transfer energy between the controller 86 and the LED array 40.

Referring generally to FIGS. 1-7, the disclosed driver circuit 10 may be used to provide a relatively cost-effective and simple approach for providing generally constant voltage and current to a load. In addition to being cost-effective and efficient, the disclosed driver circuit 10 may also provide improved intensity, hue, color temperature, and light uniformity to a string of LEDs.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A driver circuit for delivering a generally constant voltage and generally constant current to a load comprising a plurality of LED arrays, the driver circuit comprising:
    a source of incoming AC power;
    a rectifier connected to the source of incoming AC power, the rectifier producing a DC voltage;
    a constant voltage driver for receiving the DC voltage from the rectifier, the constant voltage driver comprising:
        a selectively activated switching element for receiving the DC voltage;
        a controller for receiving the DC voltage, the controller configured to send a drive signal to the switching element to activate the switching element;
        an output line providing a generally constant voltage; and
    a plurality of constant current drivers each directly in communication with the output line of the constant voltage driver to receive the generally constant voltage, wherein each of the plurality of constant current drivers provides a substantially constant current to a corresponding one of the plurality of LED arrays.

2. The driver circuit of claim 1, further comprising a buck converter in communication with the switching element, wherein the buck converter receives the DC voltage if the switching element is activated.

3. The driver circuit of claim 2, wherein the buck converter includes a freewheeling diode, a primary winding, and a secondary winding.

4. The driver circuit of claim 3, wherein the secondary winding is part of a voltage regulator circuit.

5. The driver circuit of claim 3, wherein a voltage from the primary winding is stepped down by the secondary winding before the voltage is sent to a linear voltage regulator.

6. The driver circuit of claim 1, wherein the switching element is a high-side switching element.

7. The driver circuit of claim 1, wherein the constant voltage driver includes a floating ground.

8. The driver circuit of claim 1, wherein the constant voltage driver is grounded to earth.

9. The driver circuit of claim 1, wherein the load is driven using pulse width modulated (PWM) control or linear control.

10. The driver circuit of claim 1, wherein the plurality of constant current drivers each includes a current controller for providing a generally constant current to the load.

11. The driver circuit of claim 1, wherein the plurality of constant current drivers are each grounded to earth.

12. The driver circuit of claim 1, wherein the plurality of constant current drivers each includes a floating ground.

13. The driver circuit of claim 1, wherein the plurality of LED arrays are based on red, green, blue (RGB) color mixing, and wherein each of the plurality of constant current drivers drives each of the plurality of LED arrays separately from one another to produce a light output of a specified color.

14. The driver circuit of claim 1, wherein the plurality of LED arrays comprise white LEDs, and wherein each of the plurality of constant current drivers drives each of the plurality of LED arrays separately from one another in order to modify a color temperature of the white LEDs.

15. The driver circuit of claim 1, wherein the plurality of LED arrays comprise white LEDs, and wherein each of the plurality of constant current drivers drives each of the plurality of LED arrays separately from one another such that as the LED arrays are dimmed, a color temperature of the plurality of LED arrays is increased.

16. The driver circuit of claim 1, further comprising an electromagnetic interference (EMI) filter connected to the rectifier.

17. A driver circuit for delivering a generally constant voltage and generally constant current to a plurality of LED arrays, the driver circuit comprising:
    a source of incoming AC power;
    a rectifier connected to the incoming source of AC power, the rectifier producing a DC voltage;
    a constant voltage driver for receiving the DC voltage from the rectifier, wherein the constant voltage driver includes a floating ground, the constant voltage driver comprising:
        a selectively activated high-side switching element for receiving the DC voltage;
        a controller for receiving the DC voltage, the controller configured to send a drive signal to the high-side switching element to activate the high-side switching element; and
        an output line providing a generally constant voltage; and
    plurality of constant current drivers each directly in communication with the output line of the constant voltage driver to receive the generally constant voltage, wherein each of the plurality of constant current drivers provides a substantially constant current to a corresponding one of the plurality of LED arrays.

18. The driver circuit of claim 17, further comprising a buck converter in communication with the high-side switching element, wherein the buck converter receives the DC voltage if the high-side switch is activated.

19. The driver circuit of claim 18, wherein the buck converter includes a freewheeling diode, a primary winding, and a secondary winding.

20. The driver circuit of claim 19, wherein the secondary winding is part of a voltage regulator circuit.

21. The driver circuit of claim 19, wherein a voltage from the primary winding is stepped down by the secondary winding before the voltage is sent to a linear voltage regulator.

22. The driver circuit of claim 17, wherein the plurality of constant current drivers each includes a current controller for providing a generally constant current to the load.

23. The driver circuit of claim 17, wherein the plurality of constant current drivers are each grounded to earth.

24. The driver circuit of claim 17, wherein the plurality of LED arrays are based on red, green, blue (RGB) color mixing, and wherein each of the plurality of constant current drivers drives each of the plurality of LED arrays separately from one another to produce a light output of a specified color.

25. The driver circuit of claim 17, wherein the plurality of LED arrays comprise white LEDs, and wherein each of the plurality of constant current drivers drives each of the plurality of LED arrays separately from one another in order to modify a color temperature of the white LEDs.

26. The driver circuit of claim 17, wherein the plurality of LED arrays comprise white LEDs, and wherein each of the plurality of constant current drivers drives each of the plurality of LED arrays separately from one another such that as the LED arrays are dimmed, a color temperature of the plurality of LED arrays is increased.

27. A driver circuit for delivering a generally constant voltage and generally constant current to a plurality of LED arrays, the driver circuit comprising:
   a source of incoming AC power;
   a rectifier connected to the incoming source of AC power, the rectifier producing a DC voltage;
   a constant voltage driver for receiving the DC voltage from the rectifier, wherein the constant voltage driver is grounded to earth, the constant voltage driver comprising:
      a selectively activated switching element for receiving the DC voltage;
      a controller for receiving the DC voltage, the controller configured to send a drive signal to the switching element to activate the switching element; and
      an output line providing a generally constant voltage; and
   plurality of constant current drivers each directly in communication with the output line of the constant voltage driver to receive the generally constant voltage, wherein each of the plurality of constant current drivers provides a substantially constant current to a corresponding one of the plurality of LED arrays.

28. The driver circuit of claim 27, further comprising a buck converter in communication with the switching element, wherein the buck converter receives the DC voltage if the switch is activated.

29. The driver circuit of claim 28, wherein the buck converter includes a freewheeling diode, a primary winding, and a secondary winding.

30. The driver circuit of claim 29, wherein the secondary winding is part of a voltage regulator circuit.

31. The driver circuit of claim 29, wherein a voltage from the primary winding is stepped down by the secondary winding before the voltage is sent to a linear voltage regulator.

32. The driver circuit of claim 27, wherein the plurality of constant current drivers each includes a current controller for providing a generally constant current to the load.

33. The driver circuit of claim 27, wherein the plurality of constant current drivers each include a floating ground.

34. The driver circuit of claim 27, wherein the plurality of LED arrays are based on red, green, blue (RGB) color mixing, and wherein each of the plurality of constant current drivers drives each of the plurality of LED arrays separately from one another to produce a light output of a specified color.

35. The driver circuit of claim 27, wherein the plurality of LED arrays comprise white LEDs, and wherein each of the plurality of constant current drivers drives each of the plurality of LED arrays separately from one another in order to modify a color temperature of the white LEDs.

36. The driver circuit of claim 27, wherein the plurality of LED arrays comprise white LEDs, and wherein each of the plurality of constant current drivers drives each of the plurality of LED arrays separately from one another such that as the LED arrays are dimmed, a color temperature of the plurality of LED arrays is increased.

37. A driver circuit for delivering a generally constant voltage and generally constant current to a load, the driver circuit comprising:
   a source of incoming AC power;
   a rectifier connected to the source of incoming AC power, the rectifier producing a DC voltage;
   a constant voltage driver for receiving the DC voltage from the rectifier, the constant voltage driver comprising:
      a selectively activated switching element for receiving the DC voltage;
      a controller for receiving the DC voltage, the controller configured to send a drive signal to the switching element to activate the switching element;
      an output line providing a generally constant voltage;
   at least one constant current driver in communication with the output line of the constant voltage driver to receive the generally constant voltage; and
   a buck converter in communication with the switching element, wherein the buck converter receives the DC voltage if the switching element is activated.

38. The driver circuit of claim 37, wherein the buck converter includes a freewheeling diode, a primary winding, and a secondary winding.

39. The driver circuit of claim 38, wherein the secondary winding is part of a voltage regulator circuit.

40. The driver circuit of claim 38, wherein a voltage from the primary winding is stepped down by the secondary winding before the voltage is sent to a linear voltage regulator.

41. The driver circuit of claim 37, wherein the switching element is a high-side switching element.

42. The driver circuit of claim 37, wherein the constant voltage driver includes a floating ground.

43. The driver circuit of claim 37, wherein the constant voltage driver is grounded to earth.

* * * * *